April 28, 1925.
J. F. BROMMER
1,535,648
REMOVABLE SIDE WINDOW FOR AUTOMOBILES
Filed May 18, 1921
Fig. 1.
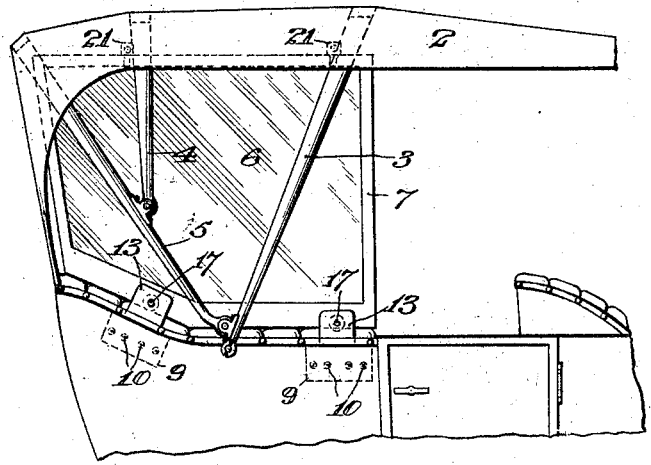
Fig. 2.
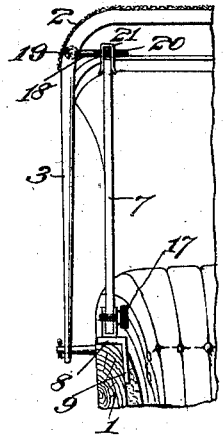
Fig. 3.
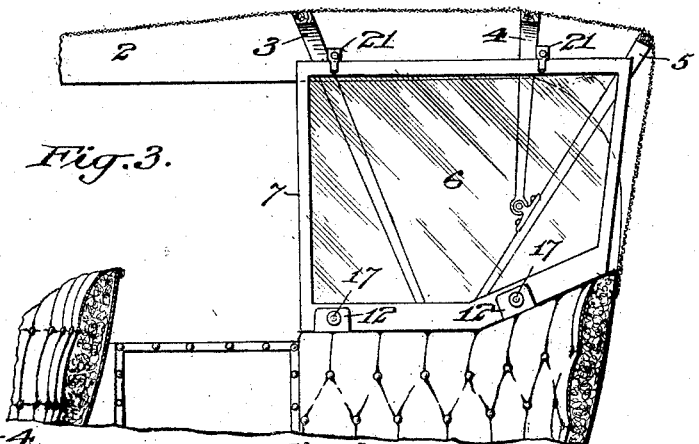
Fig. 4.
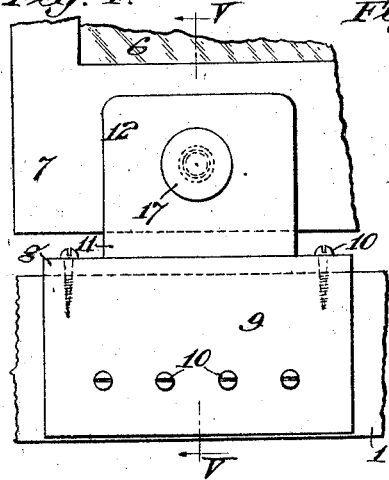
Fig. 5.
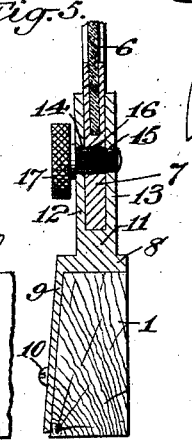
Fig. 6.
Fig. 7.
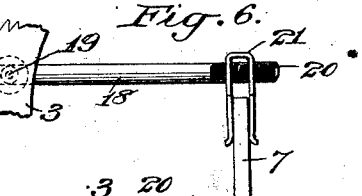
Inventor:-
John Frederick Brommer
by his attorneys Patented Apr. 28, 1925.

1,535,648

UNITED STATES PATENT OFFICE.

JOHN FREDERICK BROMMER, OF NEW YORK, N. Y.

REMOVABLE SIDE WINDOW FOR AUTOMOBILES.

Application filed May 18, 1921. Serial No. 470,577.

*To all whom it may concern:*

Be it known that I, JOHN FREDERICK BROMMER, a citizen of the United States, and resident of the borough of Queens, in the city and State of New York, have invented a new and useful Improvement in Removable Side Windows for Automobiles, of which the following is a specification.

My invention comprises novel means for removably securing in position rigid side windows for the rear seat of an automobile having the usual folding top, said means being portable and readily adjusted to the body and top frames without the necessity of altering the same.

The object of my invention is to provide means of the above character which will rigidly connect the windows to the body frame and yieldingly connect the windows to the top frame so that the independent movements of the top with respect to the body will not crack or break the windows.

A still further object is to provide means of the above character which will hold the windows against liability to rattle.

A practical embodiment of my invention is represented in the accompanying drawings, in which, Fig. 1 represents in detail side elevation so much of an automobile with the usual folding top as will give a clear illustration of the application of my novel means for removably securing the side windows for the rear seat in position.

Fig. 2 represents a detail transverse vertical section taken in the plane of the line II—II of Fig. 1.

Fig. 3 represents a detail longitudinal vertical section through the automobile.

Fig. 4 represents an enlarged detail inside view of one of the body brackets.

Fig. 5 represents a transverse vertical section taken in the plane of the line V—V of Fig. 4.

Fig. 6 represents a detail side view of one of the top frame latches.

Fig. 7 represents an inside end view of the same.

One of the side rails of the automobile body is denoted by 1. The usual folding top is denoted by 2 and the bows of the top frame are denoted by 3, 4 and 5. In the present instance the ends of the bow 4 are shown as pivoted to the bow 5 and the ends of the bow 5 are shown as pivoted to the bow 3.

Each of the removable rigid side windows for the rear seat comprises the pane 6 and its frame 7.

The means which I have shown for rigidly connecting the bottom of each rigid side widow to the body frame comprises a pair of front and rear brackets, each of which brackets may be constructed as follows:—

The base 8 of the bracket rests upon the top of the body side rail 1 and the said bracket may be provided with a depending flange 9 extending along the inside of the said rail 1. Screws or other suitable fastening means 10 may be employed for securing the bracket to the rail 1 within the upholstery. The bracket is provided with an uprising socket 11 between the branches 12 and 13 of which the bottom of the side window is inserted. These branches 12 and 13 are provided with holes 14, 15 in alinement with a hole 16 through the frame 7. A set screw 17 is inserted through the holes 14, 15 and 16 and has a screw-threaded engagement with the walls of one of the holes, for instance the hole 15 for rigidly securing the bottom of the window to the bracket.

At each side of the top frame I provide front and rear devices for yieldingly connecting the top of the rigid side window to the top frame, each of which devices is herein shown as comprising a vertical swinging latch 18 pivoted at 19 to one of the frame bows, the free end of which latch is threaded as shown at 20. A clip 21 for embracing the top of the window frame 7 engages the screw-threaded portion 20 of the latch 18 so as to permit the clip to be adjusted along the latch to bring the top of the side window into proper position.

It will be seen that by combining in each of the top frame devices a latch swinging vertically in one plane and a clip swinging vertically in a plane at right angles thereto, a very effective means is employed for yieldingly connecting the top of the side window to the top frame so as to permit the top frame to have independent movements in all directions with respect to the body of the automobile without danger of cracking or breaking the windows, the windows being also free to slide within the clips if necessary.

It will also be seen that the side windows are supported rigidly from the body inside of the top frame bows at a predetermined distance therefrom, thus positioning the side windows at the most advantageous points for the protection of the occupant or occupants of the rear seat.

It is evident that various changes may be resorted to in the construction, form and arrangement of the several parts without departing from the spirit and scope of my invention; hence I do not wish to limit myself to the particular embodiment herein shown and described, but

What I claim is:—

1. The combination with an automobile body frame and its folding top frame, of removable rigid side windows for the rear seat, brackets carried by the body frame, having uprising branches forming sockets for receiving the bottoms of the windows, bolts passing through the branches and window bottoms for rigidly securing the windows in the sockets, and latches hinged to the top frame having spring clips for frictionally engaging the tops of the windows to yieldingly hold the windows in position, the spring clips being adjustable on the latches.

2. The combination with an automobile body frame and its folding top frame, of removable rigid side windows for the rear seat, brackets carried by the body frame, having uprising branches forming sockets for receiving the bottoms of the windows, bolts passing through the branches and window bottoms for rigidly securing the windows in the sockets, and latches hinged to the top frame having spring clips for frictionally engaging the tops of the windows to yieldingly hold the windows in position, the said latches having a swinging movement in planes at right angles to the windows and the spring clips having a swinging movement in the same planes as the windows.

3. The combination with an automobile body frame and its folding top frame, of removable rigid side windows for the rear seat, brackets carried by the body frame, having uprising branches forming sockets for receiving the bottoms of the windows, bolts passing through the branches and window bottoms for rigidly securing the windows in the sockets, and latches hinged to the top frame having spring clips for frictionally engaging the tops of the windows to yieldingly hold the windows in position, the said latches having a swinging movement in planes at right angles to the windows and the said spring clips having a swinging movement in the same planes as the windows, the spring clips being adjustable on the latches.

In testimony, that I claim the foregoing as my invention, I have signed my name this 26th day of April, 1921.

JOHN FREDERICK BROMMER.